US010017355B2

(12) United States Patent
Silvennoinen et al.

(10) Patent No.: US 10,017,355 B2
(45) Date of Patent: Jul. 10, 2018

(54) METHOD OF TRIGGERING A PERSONALIZED ELEVATOR SERVICE BASED AT LEAST ON SENSOR DATA

(71) Applicants: Henry Silvennoinen, Helsinki (FI); Jukka Salmikuukka, Espoo (FI); Kim Bergman, Helsinki (FI); Mika Belov, Tuusula (FI); Mine Erciyas, London (GB)

(72) Inventors: Henry Silvennoinen, Helsinki (FI); Jukka Salmikuukka, Espoo (FI); Kim Bergman, Helsinki (FI); Mika Belov, Tuusula (FI); Mine Erciyas, London (GB)

(73) Assignee: Kone Corporation, Helsinki (FI)

( * ) Notice: Subject to any disclaimer, the term of this patent is extended or adjusted under 35 U.S.C. 154(b) by 361 days.

(21) Appl. No.: 14/815,238

(22) Filed: Jul. 31, 2015

(65) Prior Publication Data

US 2016/0031675 A1    Feb. 4, 2016

Related U.S. Application Data

(63) Continuation of application No. PCT/FI2013/050133, filed on Feb. 7, 2013.

(51) Int. Cl.
*B66B 1/20* (2006.01)
*B66B 1/46* (2006.01)
(Continued)

(52) U.S. Cl.
CPC ............ *B66B 1/468* (2013.01); *B66B 1/2408* (2013.01); *B66B 5/0012* (2013.01); *G05B 15/02* (2013.01);
(Continued)

(58) Field of Classification Search
CPC ..... B66B 1/468; B66B 1/2408; B66B 5/0012; B66B 2201/4615; B66B 2201/4676; G05B 15/02
(Continued)

(56) References Cited

U.S. PATENT DOCUMENTS

| 5,594,469 A | * | 1/1997 | Freeman | ............... G05B 19/106 |
| | | | | 345/157 |
| 6,161,654 A | * | 12/2000 | Sirigu | ...................... B66B 3/00 |
| | | | | 187/391 |

(Continued)

FOREIGN PATENT DOCUMENTS

| CN | 101842307 A | 9/2010 |
| JP | 2005255404 A | 9/2005 |

(Continued)

OTHER PUBLICATIONS

Extended European Search Report dated Aug. 9, 2016 issued in corresponding European Application No. 13874461.0.
(Continued)

*Primary Examiner* — Anthony Salata
(74) *Attorney, Agent, or Firm* — Harness, Dickey & Pierce, P.L.C.

(57) ABSTRACT

The invention allows personalization of an elevator service in an elevator system with destination control. Sensor data provided by a three-dimensional motion sensor and related to a passenger tracked by the three-dimensional motion sensor is received at a service unit of the elevator system with destination control. A personalized elevator service functionality for the tracked passenger is determined with the service unit based at least on the received sensor data. The personalized elevator service functionality is triggered with the service unit.

10 Claims, 3 Drawing Sheets

(51) Int. Cl.
*B66B 1/24* (2006.01)
*G05B 15/02* (2006.01)
*B66B 5/00* (2006.01)

(52) U.S. Cl.
CPC ............ *B66B 2201/4615* (2013.01); *B66B 2201/4676* (2013.01)

(58) Field of Classification Search
USPC ............ 187/247, 316, 380–388, 391–396; 340/5.27, 5.5, 5.62, 5.7, 5.71, 5.8
See application file for complete search history.

(56) References Cited

U.S. PATENT DOCUMENTS

| | | | |
|---|---|---|---|
| 7,382,895 B2* | 6/2008 | Bramblet | G07C 9/00 |
| | | | 382/103 |
| 7,598,942 B2 | 10/2009 | Underkoffler et al. | |
| 8,020,672 B2* | 9/2011 | Lin | B66B 1/34 |
| | | | 187/316 |
| 8,370,383 B2 | 2/2013 | Kramer et al. | |
| 8,407,725 B2 | 3/2013 | Kramer et al. | |
| 8,531,396 B2 | 9/2013 | Underkoffler et al. | |
| 8,537,111 B2 | 9/2013 | Underkoffler et al. | |
| 8,537,112 B2 | 9/2013 | Underkoffler et al. | |
| 8,544,612 B2* | 10/2013 | Korhonen | B66B 1/468 |
| | | | 187/387 |
| 8,705,872 B2* | 4/2014 | Ivanich | H04N 5/4403 |
| | | | 345/156 |
| 9,045,314 B2* | 6/2015 | Finschi | B66B 1/467 |
| 9,079,749 B2* | 7/2015 | Hsieh | B66B 3/002 |
| 9,323,232 B2* | 4/2016 | Blom | G05B 13/00 |
| 9,481,548 B2* | 11/2016 | Siddiqui | B66B 1/2416 |
| 2006/0037818 A1 | 2/2006 | Deplazes et al. | |
| 2006/0187196 A1 | 8/2006 | Underkoffler et al. | |
| 2008/0271053 A1 | 10/2008 | Kramer et al. | |
| 2009/0231278 A1 | 9/2009 | St Hilaire et al. | |
| 2009/0278915 A1 | 11/2009 | Kramer et al. | |
| 2010/0053304 A1 | 3/2010 | Underkoffler et al. | |
| 2010/0060570 A1 | 3/2010 | Underkoffler et al. | |
| 2010/0060576 A1 | 3/2010 | Underkoffler et al. | |
| 2010/0066676 A1 | 3/2010 | Kramer et al. | |
| 2010/0090946 A1 | 4/2010 | Underkoffler et al. | |
| 2010/0090947 A1 | 4/2010 | Underkoffler et al. | |
| 2010/0127968 A1 | 5/2010 | Kramer et al. | |
| 2010/0128062 A1 | 5/2010 | Kramer et al. | |
| 2010/0131549 A1 | 5/2010 | Kramer et al. | |
| 2010/0280988 A1 | 11/2010 | Underkoffler et al. | |
| 2010/0281440 A1 | 11/2010 | Underkoffler et al. | |
| 2011/0018803 A1 | 1/2011 | Underkoffler et al. | |
| 2011/0025598 A1 | 2/2011 | Underkoffler et al. | |
| 2011/0025603 A1 | 2/2011 | Underkoffler et al. | |
| 2012/0268364 A1 | 10/2012 | Minnen | |
| 2012/0326963 A1 | 12/2012 | Minnen | |
| 2013/0076522 A1 | 3/2013 | Csaszar et al. | |
| 2013/0076616 A1 | 3/2013 | Csaszar et al. | |
| 2013/0076617 A1 | 3/2013 | Csaszar et al. | |
| 2016/0103500 A1* | 4/2016 | Hussey | G06F 3/046 |
| | | | 345/173 |
| 2016/0214830 A1* | 7/2016 | Simcik | B66B 1/468 |
| 2016/0311646 A1* | 10/2016 | Bryant | G06K 9/00288 |
| 2016/0368732 A1* | 12/2016 | Zhao | B66B 1/3476 |

FOREIGN PATENT DOCUMENTS

| | | |
|---|---|---|
| JP | 2010018394 A | 1/2010 |
| JP | 2011002339 A | 1/2011 |
| WO | WO-2004/084556 A1 | 9/2004 |
| WO | WO-2006115334 A1 | 11/2006 |
| WO | WO-2010030822 A1 | 3/2010 |
| WO | WO-2010040899 A1 | 4/2010 |

OTHER PUBLICATIONS

Chinese Office Action dated Apr. 8, 2016 issued in corresponding Chinese Application No. 201380072458.1 (no English translation).
International Search Report PCT/ISA/210 for International Application No. PCT/FI2013/050133 dated Oct. 18, 2013.

* cited by examiner

METHOD OF TRIGGERING A PERSONALIZED ELEVATOR SERVICE BASED AT LEAST ON SENSOR DATA

This application is a continuation of PCT International Application No. PCT/FI2013/050133 which has an International filing date of Aug. 23, 2011, the entire contents of which are incorporated herein by reference.

BACKGROUND OF THE INVENTION

Field of the Invention

The invention relates to personalization of an elevator service. In particular, the invention relates to personalization of an elevator service in an elevator system with destination control.

Description of the Related Art

From the point of view of controlling elevator cars, there are two major control arrangements in use today: elevator systems with traditional control and elevator systems with destination control.

In an elevator system with traditional control, controls both external and internal to an elevator car are provided. A passenger first operates the external controls, such as up and down buttons provided at each floor, to select the desired direction. In response to an up or down button pressed at a certain floor, the elevator arrives to pick up the passenger. Once inside the elevator car, the passenger operates call buttons inside the elevator car to choose his/her destination floor.

In an elevator system with destination control, destination control panels (also known as destination operating panels) are provided outside elevator cars (typically at each floor) where a passenger registers his/her destination floor call before entering the car. The system lets each passenger know which car to wait for, instead of everyone boarding the next car. Accordingly, travel time is reduced as the elevator car makes fewer stops for individual passengers, and the computer distributes adjacent stops to different cars in the bank. Typically, inside the elevator car there are no call buttons to push, but only indicators that indicate stopping floors. Elevator systems with destination control are typically used in sky-scraper buildings and other large buildings.

While an elevator system with destination control has several advantages over an elevator system with traditional control, there is still need for customized elevator services, particularly services that are personalized on a passenger specific basis. At the same time, such personalized services should not cause privacy issues.

Therefore, an object of the present invention is to alleviate the problems described above and to introduce a solution that allows personalization of an elevator service in an elevator system with destination control, yet avoiding privacy issues.

SUMMARY OF THE INVENTION

A first aspect of the present invention is a method of personalizing an elevator service in which method sensor data provided by a three-dimensional motion sensor and related to a passenger tracked by the three-dimensional motion sensor is received at a service unit of an elevator system with destination control. A personalized elevator service functionality for the tracked passenger is determined with the service unit based at least on the received sensor data. The personalized elevator service functionality is triggered with the service unit.

A second aspect of the present invention is a service unit for personalizing an elevator service in an elevator system with destination control. The service unit comprises at least one processor, and at least one memory including computer program code. The at least one memory and the computer program code are the service unit at least to perform: receiving sensor data provided by a three-dimensional motion sensor and related to a passenger tracked by the three-dimensional motion sensor; determining a personalized elevator service functionality for the tracked passenger based at least on the received sensor data; and triggering the personalized elevator service functionality.

A third aspect of the present invention is service unit for personalizing an elevator service in an elevator system with destination control. The apparatus comprises: means for receiving sensor data provided by a three-dimensional motion sensor and related to a passenger tracked by the three-dimensional motion sensor; means for determining a personalized elevator service functionality for the tracked passenger based at least on the received sensor data; and means for triggering the personalized elevator service functionality.

A fourth aspect of the present invention is a computer program which comprises code adapted to cause the following when executed on a data-processing system: receiving, at a service unit of an elevator system with destination control, sensor data provided by a three-dimensional motion sensor and related to a passenger tracked by the three-dimensional motion sensor; determining, with the service unit, a personalized elevator service functionality for the tracked passenger based at least on the received sensor data; and triggering, with the service unit, the personalized elevator service functionality.

configured to, with the at least one processor, cause elevator system with destination control which comprises the service unit of the second or third aspect.

In an embodiment of the invention, the sensor data comprises at least one of recognition data and categorization data of at least one of: the passenger, an object associated with the passenger, a gesture made by the passenger, position of the passenger, movement of the passenger, direction of the passenger, speed of the passenger, and behavior of the passenger.

In an embodiment of the invention, at least one of identification data of the passenger, destination floor data of the passenger, and aural data of the passenger is received at the service unit. The determination of the personalized elevator service functionality is performed based at least on the received sensor data, and at least one of the received identification data, the received destination floor data and the received aural data.

In an embodiment of the invention, the personalized elevator service functionality comprises at least one of: display of content personalized for the passenger on a screen; personalized allocation of an elevator car for the passenger; adjustment of a safety function of the elevator system for the passenger; delay of door closing of an elevator car allocated for the passenger; wake-up of an elevator car in a stand-by mode in response to the passenger tracked to be approaching the elevator system; automatic re-allocation of an elevator car for the passenger tracked to having missed a previously allocated elevator car; automatic activation of loading mode for an elevator car allocated for the passenger tracked to be loading items to the elevator car;

automatic allocation of an elevator car to a given destination floor for the passenger tracked to having crossed a predetermined floor area associated with the destination floor; automatic performance of a predetermined functionality for the passenger tracked to having crossed a predetermined floor area; and opening of an automatic building door only in response to a predefined gesture tracked to having been made by the passenger.

In an embodiment of the invention, it is waited for a predefined gesture tracked to having been made by the passenger before performing the triggering of the personalized elevator service functionality.

It is to be understood that the aspects and embodiments of the invention described above may be used in any combination with each other. Several of the aspects and embodiments may be combined together to form a further embodiment of the invention. A method, a service unit, a computer program or a system which is an aspect of the invention may comprise at least one of the embodiments of the invention described above.

The invention allows personalization of an elevator service in an elevator system with destination control. Since the invention utilizes a three-dimensional motion sensor (rather than e.g. a camera shooting the passengers and possibly recording the footage) for the various recognition and categorization tasks, privacy issues are avoided.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

Figure 1:
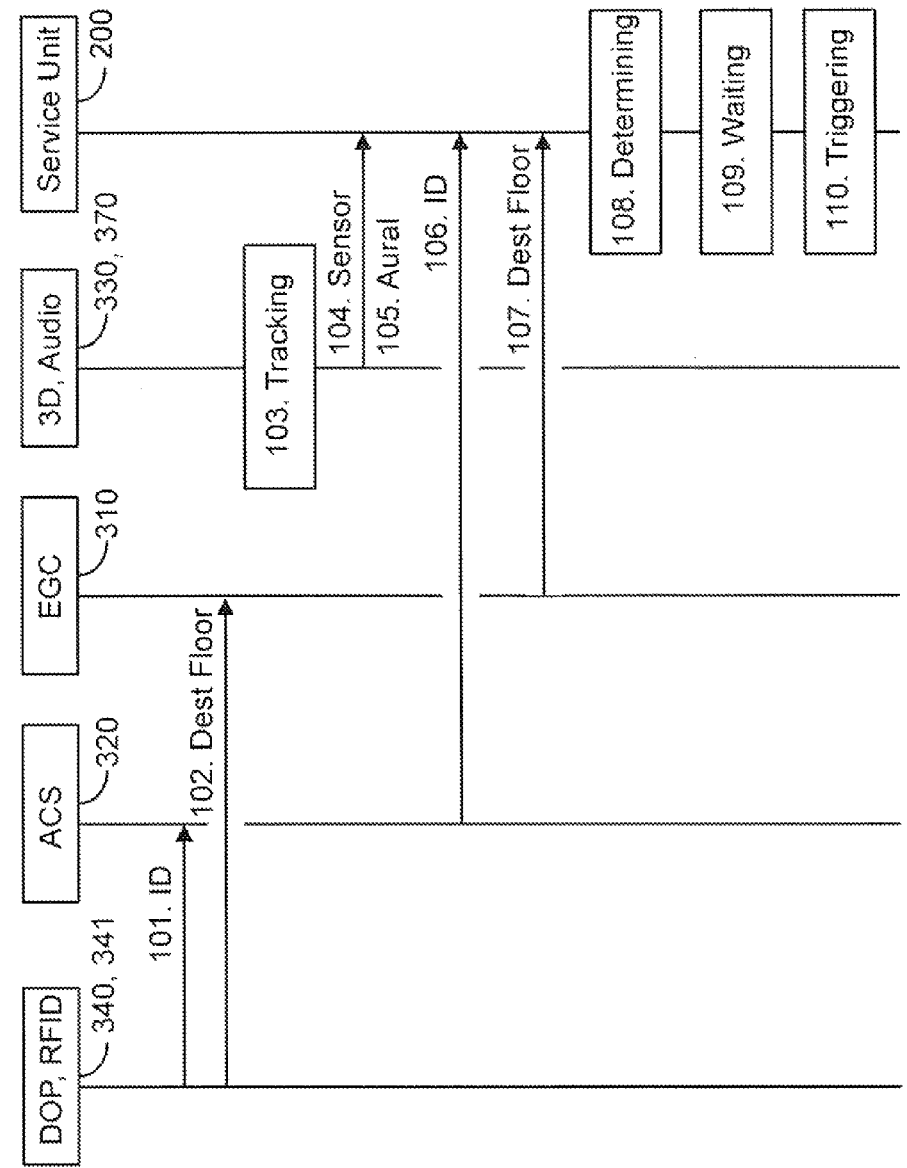
FIG. 1 is a signaling diagram illustrating a method according to an embodiment of the present invention.

FIG. 1 is a signaling diagram illustrating a method of personalizing an elevator service according to an embodiment of the present invention.

At optional step 101, identification data of a passenger is received at an access control system of a building in which an elevator system with destination control is located. As shown in FIG. 1, the identification data may be received e.g. from a radio-frequency identification (RFID) reader. The RFID reader may be provided e.g. in a destination control panel (also known as a destination operating panel, DOP) of the elevator system. The passenger may e.g. swipe or otherwise enter his/her RFID card to the RFID reader.

At optional step 102, destination floor data of the passenger is received at an elevator group controller of the elevator system with destination control. As shown in FIG. 1, the destination floor data may be received e.g. from the destination control panel of the elevator system. The passenger may e.g. enter his/her destination floor in the destination control panel.

At step 103, a three-dimensional motion sensor tracks the passenger. At step 104, sensor data provided by the three-dimensional motion sensor and related to the passenger tracked by the three-dimensional motion sensor is received at a service unit of the elevator system with destination control. The sensor data may comprise at least one of recognition data and categorization data of at least one of: the passenger, an object associated with the passenger, a gesture made by the passenger, position of the passenger, movement of the passenger, direction of the passenger, speed of the passenger, and behavior of the passenger.

At optional step 105, aural data of the passenger is received at an elevator group controller of the elevator system with destination control. As shown in FIG. 1, the aural data may be received e.g. from an audio sensor arranged in the elevator system.

At optional step 106, the identification data of the passenger is received at the service unit of the elevator system from the access control system. At optional step 107, the destination floor data of the passenger is received at the service unit of the elevator system from the elevator group controller of the elevator system.

At step 108, a personalized elevator service functionality for the tracked passenger is determined with the service unit based at least on the sensor data provided by the three-dimensional motion sensor. If the identification data, the destination floor data and/or aural are also received at the service unit, they may also be utilized in determining the personalized elevator service functionality for the tracked passenger, as further detailed below.

At optional step 109, the service unit waits until it receives sensor data from the three-dimensional motion sensor that indicates that the passenger has made a predefined gesture (such as a gesture predefined as an acknowledgement gesture) before moving on to step 110.

At step 110, the personalized elevator service functionality is triggered with the service unit.

The following discusses examples of the personalized elevator service functionality.

Display of content personalized for the passenger on a screen. E.g. elevator car and/or lobby display content is changed based on recognized passenger characteristics: e.g. a passenger is recognized as a child (e.g. based on recognized shape) and display is arranged to show content targeted for children, or a passenger is recognized as a wheel chair user and accessibility info is shown. Furthermore, a passenger's position in an elevator car may be recognized and predetermined features may be triggered based on that position data—e.g. content may be activated only on a screen in front of the user. Furthermore, a passenger may be shown information relevant to current situation/conditions, such as "air conditioning is temporarily unavailable". Furthermore, a passenger may be guided in regards to expected actions, such as "go through reception to pick up a delivery". Furthermore, a passenger may be guided in regards to a route to follow, such as when walking by screen #1: "walk right 50 meters through corridor X to lobby B to get elevator C", and when getting to lobby B by screen #2, it shows "take elevator C on the left". Utilization of the 3D motion sensor in the invention allows recognizing shapes and/or characteristics of the passenger.

Personalized allocation of an elevator car for the passenger. E.g. a passenger with a baby carriage or a shopping cart may be recognized (e.g. based on shape) and an elevator car most suitable (e.g. in terms of available elevator car space) may be allocated. Furthermore, a passenger with a pet may be recognized (e.g. based on shape), and an elevator car most suitable (e.g. in terms of allergies) may be allocated. Utilization of the 3D motion sensor in the invention allows recognizing shapes and/or characteristics of various objects associated with the passenger.

Adjustment of a safety function of the elevator system for the passenger. E.g. a long range curtain of light may be implemented which takes into account the recognized speed of an approaching passenger and the door open time may be extended if the passenger is approaching with high speed, but if is recognized that that distance is long and the passenger's speed is low, the elevator car door can be closed normally and the passenger needs to wait for a next elevator car. Furthermore, if a passenger is recognized as a child (e.g. based on recognized shape), curtain of light could be made larger. Utilization of the 3D motion sensor in the invention allows performing the recognition early enough, and recognizing shapes and speed.

Delay of door closing of an elevator car allocated for the passenger. For example, a passenger with a pet is recognized (e.g. based on recognized shape), and the elevator car does not leave until both the passenger and the dog are in the elevator car or until both have exited the car elevator, thereby preventing accidents where a pet is still in the elevator car and the passenger is already out when the elevator doors close and the elevator car leaves. Furthermore, a slow moving passenger may be recognized, and delay the closing of the doors accordingly. Furthermore, a group of passengers may be recognized, and delay the closing of the doors until everyone is inside the elevator car or until everyone has exited side the elevator car. Utilization of the 3D motion sensor in the invention allows recognition of objects' shapes, speed and surroundings both in and outside of elevator cars.

Wake-up of an elevator car in a stand-by mode in response to the passenger tracked to be approaching the elevator system. A passenger arriving to the elevator lobby is recognized, and elevator cars in deep standby mode can be woken up in time to have them ready. With 3D motion sensor utilized in the invention the passenger and his/her direction (approaching an elevator group/DOP) can be recognized from afar and early enough, and an elevator car(s) can be "woken up" from stand-by in time. Utilization of the 3D motion sensor in the invention allows covering a large area with a single sensor, which makes it possible to detect passengers from afar and from different directions (resulting in cost and energy efficiency). This also gives more time for the system to wake-up, or on the other hand the system can be kept in deeper stand-by mode.

Automatic re-allocation of an elevator car for the passenger tracked to having missed a previously allocated elevator car. For example, a passenger has made a call from the DOP, but stops to discuss with a person in the lobby and misses the allocated elevator. This is recognized, and the missed call is cancelled, and the call is remade when the passenger again approaches the elevators, either allocating the same car as previously or making a new allocation. Utilization of the 3D motion sensor in the invention allows recognizing that the passenger has stopped between the DOP and the elevator car and is losing his elevator call, and recognizing that the passenger is again moving towards the elevators.

Automatic activation of loading mode for an elevator car allocated for the passenger tracked to be loading items to the elevator car. For example, a passenger is loading several individual items (e.g. boxes) into an elevator car. The invention recognizes that the passenger has objects of predefined type left on the lobby side when he enters the car with the first box. Therefore, the invention activates a "loading mode", meaning that the elevator doors remain open and the car does not leave until user has loaded all of the objects from the lobby side to the car. This may also be used in CTU when moving construction goods to upper floors. Utilization of the 3D motion sensor in the invention allows recognizing the position of the loaded items and recognizing when all the items have been loaded, wherein the position of the items is flexible.

Automatic allocation of an elevator car to a given destination floor for the passenger tracked to having crossed a predetermined floor area associated with the destination floor. For example, spots marked in the lobby floor indicate a predetermined destination. The invention recognizes a passenger walking through that spot and automatically allocates an elevator call to that floor. Furthermore, call confirmation may be implemented with a predetermined gesture performed by the passenger (e.g. thumb up) and recognized by the invention. Furthermore, direction data of the passenger may also be utilized, e.g. if it is recognized that the passenger changes his/her direction away from the elevator cars, the allocation may be cancelled. Similarly, automatic performance of any predetermined functionality for the passenger tracked to having crossed a predetermined floor area may be implemented. Utilization of the 3D motion sensor in the invention allows managing the entire lobby area with a single system, and the number of spots is practically unlimited (depending of course on the 3D-positioning accuracy), and the number and position of the spots can be changed easily.

Opening of an automatic building door only in response to a predefined gesture tracked to having been made by the passenger. Building door may open only with a predefined hand gesture, which would prevent unwanted door openings, which in turn would save energy e.g. in winter time. Utilization of the 3D motion sensor in the invention allows recognizing if a passenger is just standing near a door (e.g. smoking) and not intending to go in—in which case the door is not Opened unnecessarily, saving energy e.g. in winter time.

Furthermore, behavior of one or more passengers may be recognized based on e.g. the sensor data and/or the aural data. For example, aggressive behavior and/or panic related behavior could be recognized, and appropriate functionality be triggered.

Figure 2:
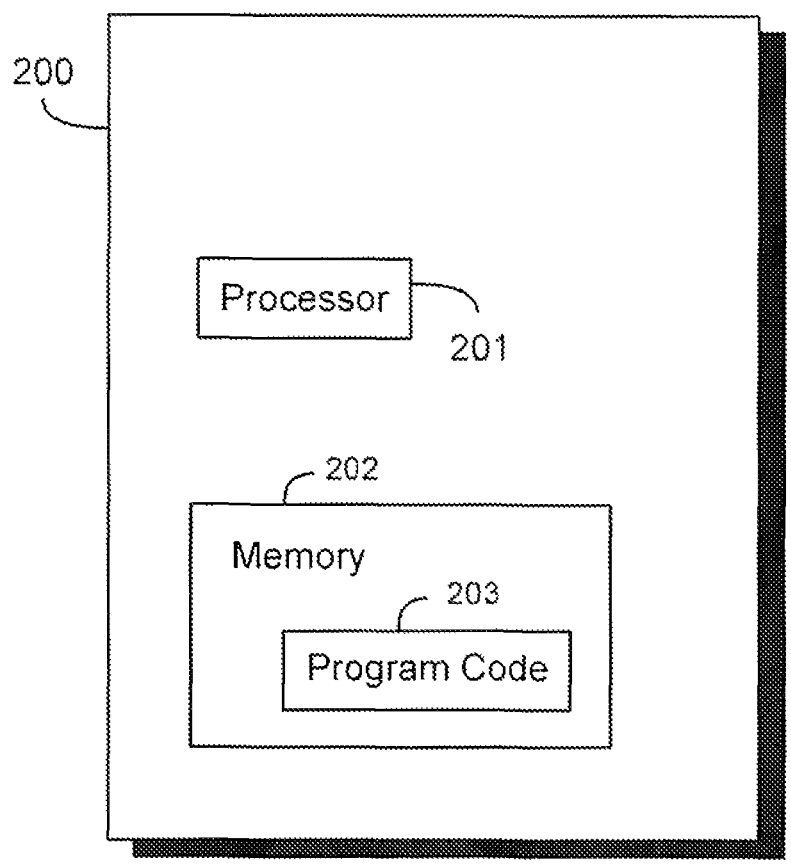
FIG. 2 is a block diagram illustrating an apparatus according to an embodiment of the present invention.
Figure 3:
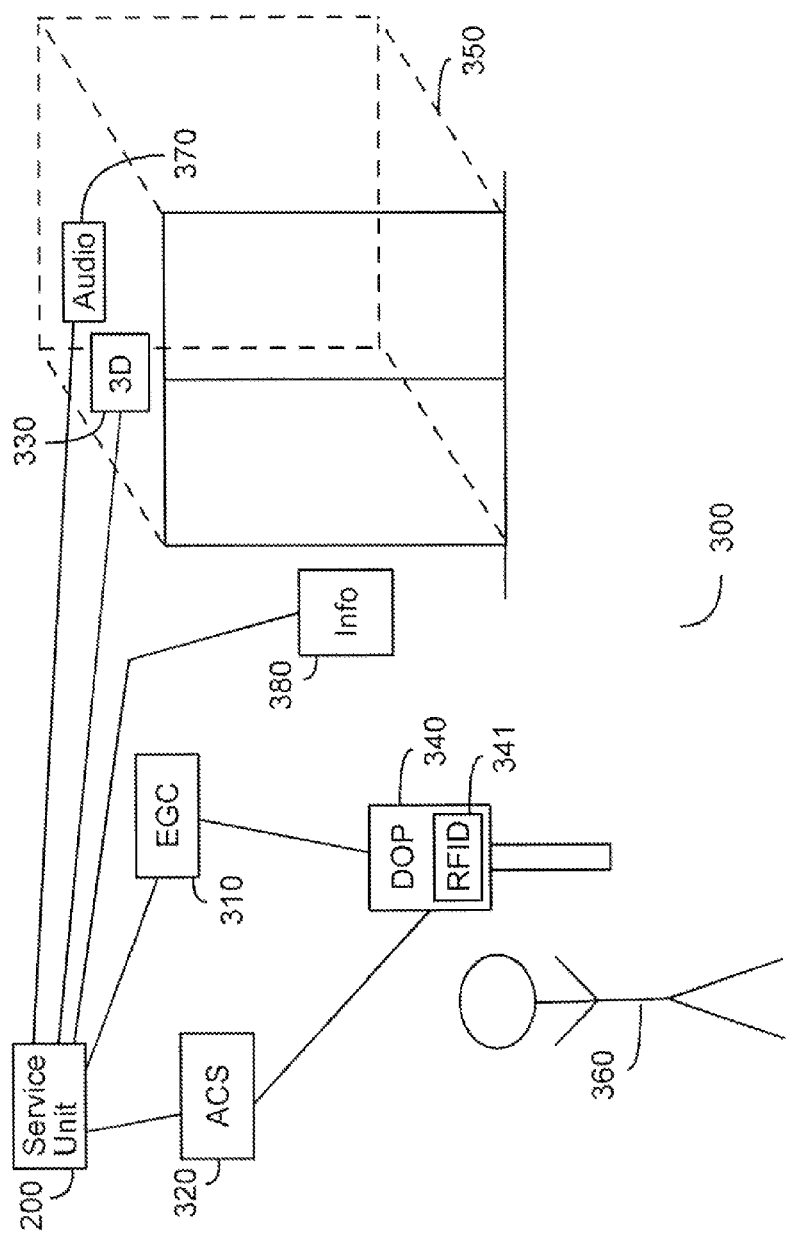
FIG. 3 illustrates an elevator system with destination control and incorporating a service unit according to an embodiment of the present invention.

FIG. 2 is a block diagram illustrating a service unit 200 for personalizing an elevator service in an elevator system with destination control according to an embodiment of the present invention. The service unit 200 comprises at least one processor 201, and at least one memory 202 that includes computer program code 203. Figure in turn illustrates an elevator system 300 with destination control and incorporating the service unit 200 of FIG. 2. As shown in FIG. 3, the service unit 200 of the invention may be implemented as a service unit that is separate from the elevator group controller 310 but still communicatively in connection with the elevator group controller 310. Alternatively, the service unit 200 of the invention may be integrated (not shown in FIG. 3) e.g. in the elevator group controller 310 of the elevator system 300.

The elevator system 300 with destination control comprises the elevator group controller 310 for controlling various functions related to processing elevator calls and transporting elevator cars based on information collected by the destination control. The elevator system 300 further comprises an access control system 320 for providing access control functions for the building in which the elevator system 300 is located. The access control system 320 may be communicatively in connection with e.g. a user identification reader, such as the RFID reader 341. The elevator system 300 further comprises one or more destination control panels 340 provided outside elevator cars (typically at each floor) where a passenger registers his/her destination floor call before entering the car.

The elevator system 300 in accordance with the present invention further comprises one or more three-dimensional motion sensors 330, typically at each floor and/or inside elevator cars, for tracking the passenger 360 and for providing related sensor data that may comprise e.g. at least one of recognition data and categorization data of at least one of: the passenger, an object associated with the passenger, a gesture made by the passenger, position of the passenger, movement of the passenger, direction of the passenger, speed of the passenger, and behavior of the passenger.

The elevator system 300 in accordance with the present invention may further comprise one or more audio sensors 370 for providing aural data related to the passenger 360. The audio sensors 370 may be arranged e.g. at each floor and/or inside elevator cars. The elevator system 300 may further comprise one or more screens 380 that can be utilized in displaying content personalized for the passenger. Even though FIG. 3 shows only one elevator car 350 for the sake of clarity, it is to be understood that in the context of the present invention, an "elevator system" may comprise one or more elevator cars.

Information collected by the destination control. The program code 203 are configured to, with the at least one processor 201, cause the service unit 200 at least to perform: receiving sensor data provided by the three-dimensional motion sensor 330 and related to the passenger 360 tracked by the three-dimensional motion sensor 330; determining a personalized elevator service functionality for the tracked passenger 360 based at least on the received sensor data; and triggering the personalized elevator service functionality.

The at least one memory 202 and the computer program code 203 may be further configured to, with the at least one processor 201, cause the service unit 200 at least to perform: receiving at least one of identification data of the passenger 360, destination floor data of the passenger 360, and aural data related to the passenger 360. In this case, the determination of the personalized elevator service functionality may be performed based at least on the received sensor data, and at least one of the received identification data, the received destination floor data and the received aural data.

The at least one memory 202 and the computer program code 203 may be further configured to, with the at least one processor 201, cause the service unit 200 at least to perform: waiting for a predefined gesture tracked to having been made by the passenger 360 before performing the triggering of the personalized elevator service functionality.

The exemplary embodiments can include, for example, any suitable servers, workstations, PCs, laptop computers, other devices, and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, 3G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The data-bases can be organized using data structures (e.g., records, tables, arrays, fields; graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Passenger Request Broker Architecture (CORBA) passengers, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

If desired, the different functions discussed herein may be performed in a different order and/or concurrently with each other.

While the present inventions have been described in connection with a number of exemplary embodiments, and implementations, the present inventions are not so limited, but rather cover various modifications, and equivalent arrangements, which fall within the purview of prospective claims.

The invention claimed is:

1. A method of personalizing an elevator service of an elevator system supporting destination control, the method comprising:
   receiving, at a controller of the elevator system, sensor data provided by three-dimensional motion sensors, the sensor data being related to a passenger tracked by the three-dimensional motion sensors when the passenger is approaching the destination control elevator system from outside an elevator car;
   receiving, by the controller, secondary data associated with the passenger, the secondary data including at least one of identification data of the passenger, destination floor data of the passenger, and audio data generated by the passenger;
   determining, by the controller, a personalized elevator service functionality for the passenger based at least on the sensor data and the secondary data; and
   triggering, by the controller, the personalized elevator service functionality.

2. The method according to claim 1, wherein the sensor data includes data identifying at least one of: the passenger, an object associated with the passenger, a gesture made by the passenger, a position of the passenger, movement of the passenger, a direction of the passenger, a speed of the passenger, and a behavior of the passenger.

3. The method according to claim 1, wherein the triggering the personalized elevator service functionality comprises at least one of:
   displaying content personalized for the passenger on a screen;
   allocating an elevator car for the passenger;
   adjusting a safety function of the elevator system for the passenger;
   delaying of door closing of an elevator car allocated for the passenger;
   waking an elevator car in a stand-by mode in response to the passenger tracked to be approaching the elevator system;
   re-allocating an elevator car for the passenger tracked to having missed a previously allocated elevator car;
   activating a loading mode for an elevator car allocated for the passenger tracked to be loading items to the elevator car;
   allocating an elevator car to a destination floor for the passenger tracked to having crossed a predetermined floor area associated with the destination floor;
   performing a predetermined functionality for the passenger tracked to having crossed a predetermined floor area; and
   opening an automatic building door only in response to a predefined gesture tracked to having been made by the passenger.

4. The method according to claim 1, further comprising:
   determining whether the passenger makes a set gesture, and
   performing the triggering of the personalized elevator service functionality when the passenger makes the set gesture.

5. A controller configured to personalize an elevator service in an elevator system with destination control, the controller comprising:
   at least one processor; and
   at least one memory including computer program code that, when executed by the at least one processor, configures the at least one processor to,
      receive sensor data provided by three-dimensional motion sensors, the sensor data being related to a passenger tracked by the three-dimensional motion sensors when the passenger is approaching the elevator system from outside an elevator car,
      receive secondary data associated with the passenger, the secondary data including at least one of identification data of the passenger, destination floor data of the passenger, and audio data generated by the passenger,
      determine a personalized elevator service functionality for the passenger based at least on the sensor data and the secondary data, and
      trigger the personalized elevator service functionality.

6. The controller according to claim 5, wherein the sensor data includes a data identifying at least one of: the passenger, an object associated with the passenger, a gesture made by the passenger, a position of the passenger, movement of the passenger, a direction of the passenger, a speed of the passenger, and a behavior of the passenger.

7. The controller according to claim 5, wherein the processor is configured to trigger the personalized elevator service functionality to perform at least one of:
   displaying content personalized for the passenger on a screen;
   allocating an elevator car for the passenger;

adjusting a safety function of the elevator system for the passenger;

delaying of door closing of an elevator car allocated for the passenger;

waking an elevator car in a stand-by mode in response to the passenger tracked to be approaching the elevator system;

re-allocating an elevator car for the passenger tracked to having missed a previously allocated elevator car;

activating a loading mode for an elevator car allocated for the passenger tracked to be loading items to the elevator car;

allocating an elevator car to a destination floor for the passenger tracked to having crossed a predetermined floor area associated with the destination floor;

performing a predetermined functionality for the passenger tracked to having crossed a predetermined floor area; and opening an automatic building door only in response to a predefined gesture tracked to having been made by the passenger.

8. The controller according to claim 5, wherein the computer program code, when executed, further configures the at least one processor to, determine whether the passenger makes a set gesture, and trigger the personalized elevator service functionality when the passenger makes the set gesture.

9. A non-transitory computer readable medium storing a computer program that, when executed on a data-processing system, configures the data-processing system to:

receive sensor data provided by three-dimensional motion sensors, the sensor data related to a passenger tracked by the three-dimensional motion sensor when the passenger is approaching a destination control elevator system from outside an elevator car, receive secondary data associated with the passenger, the secondary data including at least one of identification data of the passenger, destination floor data of the passenger, and audio data generated by the passenger, determine a personalized elevator service functionality for the passenger based at least on the sensor data and the secondary data, and trigger the personalized elevator service functionality.

10. An elevator system with destination control, the elevator system comprising:

the controller according to claim 5.

* * * * *